US006731062B2

(12) United States Patent
Stansbury

(10) Patent No.: US 6,731,062 B2
(45) Date of Patent: May 4, 2004

(54) MULTIPLE LEVEL PRINTING IN A SINGLE PASS

(75) Inventor: Darryl Stansbury, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 10/235,145

(22) Filed: Sep. 5, 2002

(65) Prior Publication Data

US 2003/0001491 A1 Jan. 2, 2003

Related U.S. Application Data

(60) Continuation of application No. 09/227,366, filed on Jan. 8, 1999, which is a division of application No. 08/779,569, filed on Jan. 7, 1997, now Pat. No. 5,766,361, which is a division of application No. 08/514,778, filed on Aug. 14, 1995, now Pat. No. 5,871,807.

(51) Int. Cl.[7] .................................................. H02J 1/62
(52) U.S. Cl. ...................................................... 313/495
(58) Field of Search ................................ 313/495, 496, 313/497, 292, 235, 238, 309, 351, 336; 315/169.3; 427/64, 66

(56) References Cited

U.S. PATENT DOCUMENTS

| | | | | | |
|---|---|---|---|---|---|
| 5,315,312 | A | * | 5/1994 | DiSanto et al. | 345/107 |
| 5,361,079 | A | * | 11/1994 | Yamamoto | 345/75.1 |
| 5,430,329 | A | * | 7/1995 | Harada et al. | 257/786 |
| 5,543,680 | A | * | 8/1996 | Tomihari | 313/336 |
| 5,612,256 | A | * | 3/1997 | Stansbury | 438/20 |
| 5,760,470 | A | * | 6/1998 | Stansbury | 257/690 |
| 5,766,053 | A | * | 6/1998 | Cathey et al. | 445/25 |
| 5,766,361 | A | * | 6/1998 | Stansbury | 118/679 |
| 5,871,807 | A | * | 2/1999 | Stansbury | 427/64 |
| 5,910,705 | A | * | 6/1999 | Cathey et al. | 313/496 |
| 6,172,456 | B1 | * | 1/2001 | Cathey et al. | 313/495 |

* cited by examiner

*Primary Examiner*—Vip Patel
*Assistant Examiner*—Karabi Guharay
(74) *Attorney, Agent, or Firm*—Hale and Dorr LLP

(57) ABSTRACT

A process is provided for forming a conductive line between a conductor and a spacer formed on a substrate of a field emission display. In one embodiment, the process performs the steps of disposing a screen between the substrate and a distributing member, the screen having an opening which permits the extrusion a conductive material, and moving the distributing member relative to the screen to extrude the conductive material through the opening and form a conductive line connecting the conductor and the spacer, wherein the snap off distance is varied according as the distributing member moves along the substrate.

22 Claims, 6 Drawing Sheets

FIELD EMISSION DISPLAY CROSS SECTION

MULTIPLE LEVEL PRINTING IN A SINGLE PASS

GOVERNMENT RIGHTS

This invention was made with Government support under Contract No. DABT 63-93-C-0025 awarded by Advanced Research Projects Agency (ARPA). The Government has certain rights in this invention.

BACKGROUND OF THE INVENTION

This invention relates to the field of electronic displays, and, more particularly, field emission display ("FED") devices.

As technology for producing small, portable electronic devices progresses, so does the need for electronic displays which are small, provide good resolution, and consume small amounts of power in order to provide extended battery operation. Past displays have been constructed based upon cathode ray tube ("CRT") or liquid crystal display ("LCD") technology. However, neither of these technologies is perfectly suited to the demands of current electronic devices.

CRT's have excellent display characteristics, such as, color, brightness, contrast and resolution. However, they are also large, bulky and consume power at rates which are incompatible with extended battery operation of current portable computers.

LCD displays consume relatively little power and are small in size. However, by comparison with CRT technology, they provide poor contrast, and only limited ranges of viewing angles are possible. Further, color versions of LCDs also tend to consume power at a rate which is incompatible with extended battery operation.

As a result of the above described deficiencies of CRT and LCD technology, efforts are underway to develop new types of electronic displays for the latest electronic devices. One technology currently being developed is known as "field emission display technology." The basic construction of a field emission display, or ("FED") is shown in FIG. 1. As seen in the figure, a field emission display comprises a face plate 100 with a transparent conductor 102 formed thereon. Phosphor dots 112 are then formed on the transparent conductor 102. The face plate 100 of the FED is separated from a baseplate 114 by a spacer 104. The spacers serve to prevent the baseplate from being pushed into contact with the faceplate by atmospheric pressure when the space between the baseplate and the faceplate is evacuated. A plurality of emitters 106 are formed on the baseplate. The emitters 106 are constructed by thin film processes common to the semi-conductor industry. Thousands of emitters 106 are formed on the baseplate 114 to provide a spatially uniform source of electrons.

FIG. 2 shows a basic construction of a typical field emission display device. As shown, there is a substrate 200 formed of a transparent material, for example, glass. On the substrate 200, there is formed conductors 202 and spacers 204. When the FED is finally assembled, conductors 202 will form the contact points necessary to connect the FED into an electronic circuit. Spacers 204 provide the required separation between die 206 and substrate 200. Without spacers 204, the die 206 would be forced together with substrate 200 by atmospheric pressure when the device is evacuated. Die 206 has surface 208 which has formed thereon the emitters which will emit electrons to form an image on phosphor layer 210. Also formed on surface 208 of die 206 are a plurality of contact pads 212 which will be connected to conductors 202 to allow operation of the device.

One method for connecting the bond pads on surface 208 to the conductors 202 is a method referred to as "flip chip" bonding. This technique is described with reference to FIGS. 3 and 4. FIG. 3 shows an example of a die 300 suitable for flip chip bonding. In this example, die 300 has contact pads 302*a*–302*n* for providing electrical connection to emitters 306. Bonding pads 302*a*–302*n* have formed thereon conductive "bumps" 304*a*–304*n*. Bumps 304*a*–304*n* provide the electrical connection necessary to the corresponding conductors on the spacers as shown in FIG. 4.

FIG. 4 is a diagram of a substrate 400 having formed thereon a phosphor layer 402, a spacer 404 and a plurality of conductors 406*a*–406*n*. Formed on the upper surface of spacer 404 are a plurality of conductors 408*a*–408*n* for providing electrical connection to bond pads 302*a*–302*n* by conductive bumps 304*a*–304*n* (see FIG. 3). However, it is still necessary to provide electrical communication between conductors 408*a*–408*n* formed on the spacer and conductors 406*a*–406*n* formed on the substrate 400. One method for providing this communication is shown in FIG. 5.

FIG. 5 is a top view of a substrate 500 having the conductors 506*a*–506*n* on the spacer 504 electrically connected to the conductors 510*a*–510*n* on the substrate 500. As shown in FIG. 5, substrate 500 has formed thereon phosphor layer 502, spacer 504 and conductors 510*a*–510*n*. Spacer 504 has formed, on an upper surface, conductors 506*a*–506*n*. Spacer conductors 506*a*–506*n* are electrically connected to substrate conductors 510*a*–510*n* by bonding wires 508*a*–508*n*. However, the connecting scheme shown in FIG. 5 is undesirable because it requires that additional manufacturing steps be taken to bond each bonding wire 508*a*–508*n* between the proper conductors on the substrate 500 and the spacer 504.

There has therefore been a need in the industry for a method and apparatus to connect substrate conductors to spacer conductors without the use of bond wires.

SUMMARY OF THE INVENTION

According to one embodiment of the invention, a process is provided for forming a conductive line between a conductor and a spacer formed on a substrate of a field emission display, the process comprising disposing a screen between the substrate and a distributing member, the screen having an opening which permits the passage of conductive material, and moving the distributing member along the screen to pass the conductive material through the opening and form a conductive line connecting the conductor and the spacer.

According to another embodiment of the invention, an apparatus is provided for forming a conductive line between a conductor and a spacer with the aid of a screen, the conductor and the spacer being formed on a substrate of a field emission display, the screen being disposed between the substrate and a distributing member and having an opening which permits the passage of conductive material. According to an aspect of the invention, the apparatus comprises a control circuit which moves the distributing member along the screen to pass the conductive material through the opening and form a conductive line connecting the conductor and the spacer.

BRIEF DESCRIPTION OF THE DRAWINGS

For a more complete understanding of the invention and for further advantages thereof, reference is made to the following Detailed Description taken in conjunction with the accompanying drawings, in which.

It is to be noted, however, that the appended drawings illustrate only typical embodiments of this invention and are therefore not to be considered limiting of its scope, for the invention may admit to other equally effective embodiments.

DETAILED DESCRIPTION OF EMBODIMENTS OF THE INVENTION

Figure 1:
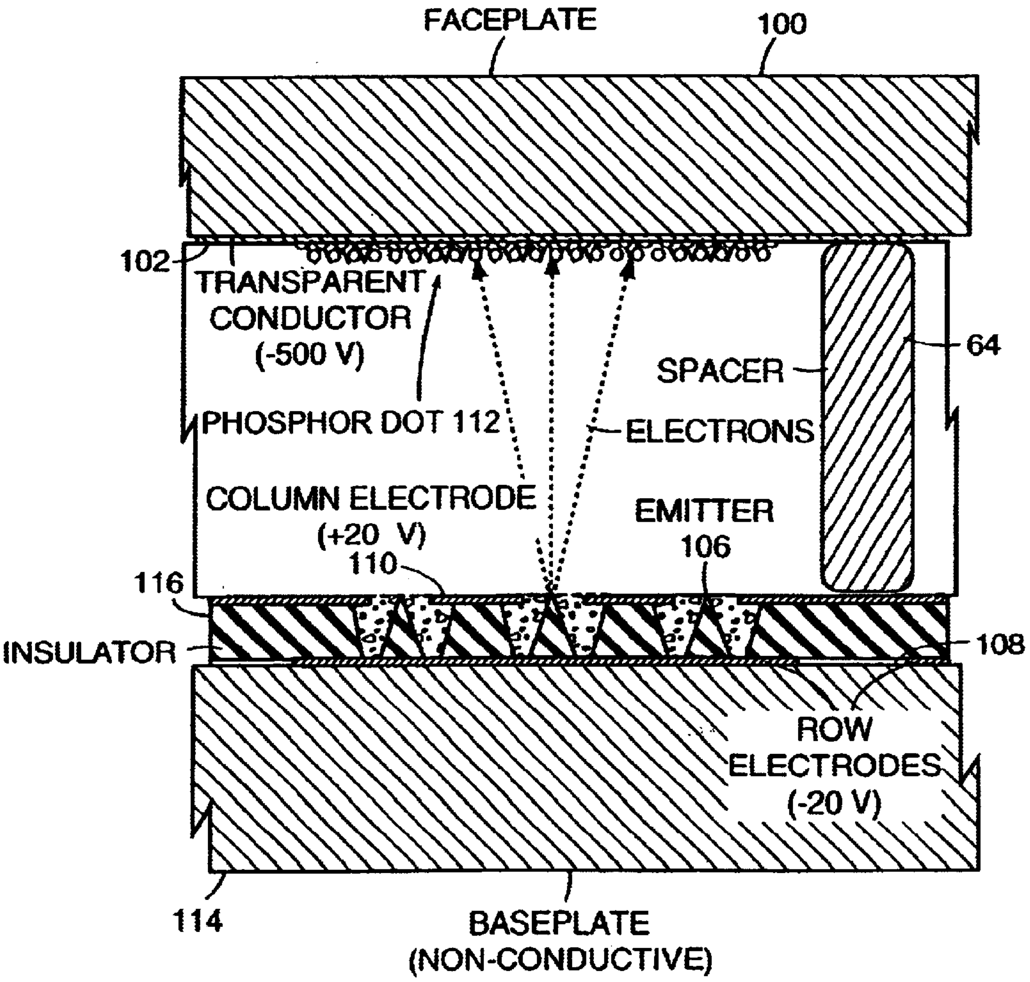
FIG. 1 PRIOR ART
FIG. 1 is a plan view showing the operation of a typical FED device.
Figure 2:
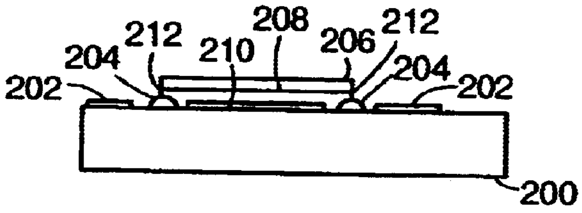
FIG. 2 PRIOR ART
FIG. 2 is a plan view showing the construction of a FED device.
Figure 3:
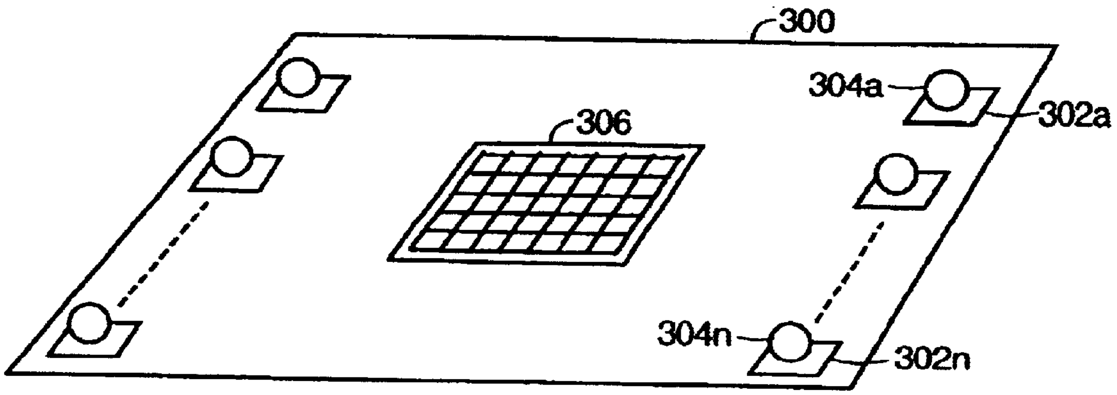
FIG. 3 is a top view of the substrate of a FED device having bumps suitable for flip chip bonding.
Figure 4:
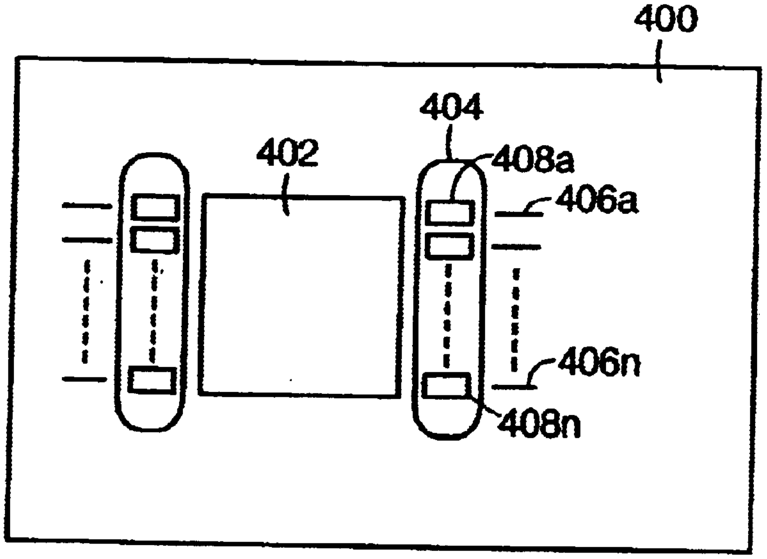
FIG. 4 is a top view of a substrate of a FED device useful with the present invention.
Figure 5:
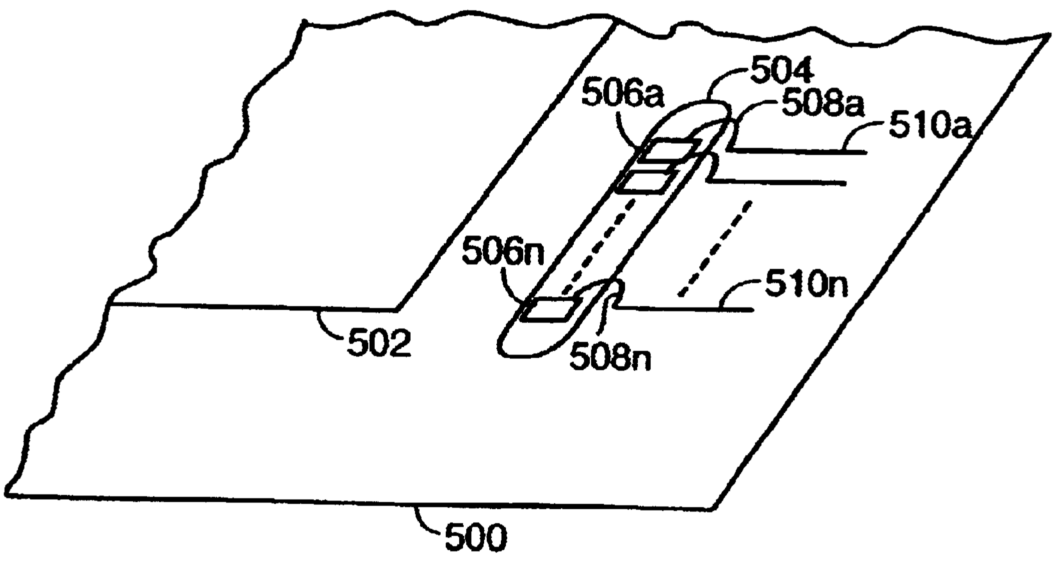
FIG. 5 is a plan view of a substrate using bonding wires.
Figure 6:
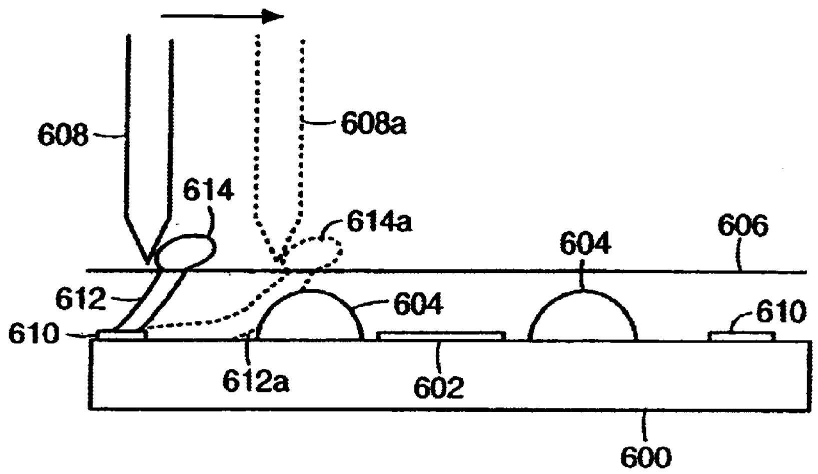
FIG. 6 is a plan view of a FED substrate showing the operation of the distributing member according to another embodiment of the invention.

Referring now to FIG. 6, a process according to an embodiment of the invention is provided for forming a conductive line 612 between a conductor 610 and a spacer 604 formed on a substrate 600 of a field emission display. In one aspect, the process comprises disposing a screen 606 between the substrate 600 and a distributing member 608, the screen 606 having an opening which permits the passage of a conductive material 614, and moving the distributing member 608 along the screen 606 to pass the conductive material 614, through the opening and form a conductive line 612 connecting the conductor 610 and the spacer 604. In the FIG. 6 embodiment, the distributing member 608 is moved along the screen 606 to the position shown by dotted line 608*a*. As it moves, it pushes conductive material 614 along with it so that a conductive line 612 is formed as shown by dotted line 612*a*. An example of a conductive material 614 known to be useful is a gold palladium paste such as TFAUPD 7395 manufactured by IMRC of Tuson, Ariz. Other examples of a useful conductive material would be EMCA, DuPont, or Ferro Conductor series. Other examples of conductive materials will occur to those skilled in the art.

It is to be noted that in the FIG. 6 embodiment, the conductive line 612 connects the conductor 610 to the upper surface of the spacer 604. Therefore, the spacer end of the conductive line 612 also functions as a spacer conductor to provide electrical communication between the bonding pads of the die (not shown) and the conductor 610. However, it will be understood by those of skill in the art that a spacer conductor could be formed in a separate operation and then connected to the conductor 610 with conductive line 612.

It will also be understood by those of skill in the art that it is possible to construct the distributing member according to various shapes as long as it functions to distribute the conductive material. For example, in one aspect, the distributing member is a squeegee which is drawn along the surface of the screen.

Examples of a useful material for manufacturing the screen are polyester or stainless steel mesh manufactured by Rigsby Screen of Torrance, Calif. Other examples of useful screen material will occur to those of skill in the art who recognize that screen materials having the properties of flexibility, material resistance and strength may be employed.

Figure 8:
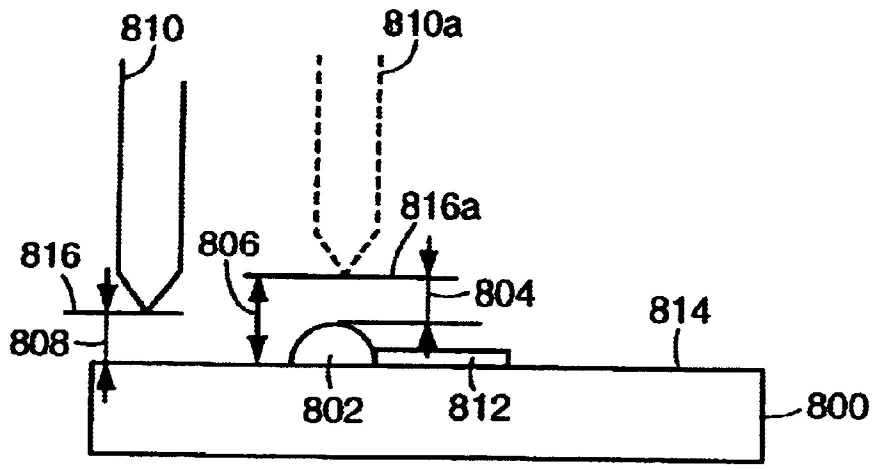
FIG. 8 is a plan view of a FED showing the operation of the distributing member according to one embodiment of the invention.

FIG. 8 shows another aspect of the invention wherein the snap off distance 808 between the screen 816 and the substrate 800 is varied responsive to the spacer 802. As shown in FIG. 8 embodiment, as the distributing member 810 moves to the position shown by dotted line 810*a*, the snap off distance 808 between screen 816 and substrate 800 increases to the distance 806 between the screen 816*a* and substrate 800. In this way, the height of the spacer 802 above the surface of the substrate 800 is taken into account as the conductive lines (not shown) are formed. This provides several advantages. For example, it prevents damage to the phosphor layer 812 formed on substrate 800 due to contact between the screen and the phosphors. Also, it eliminates separate processing using expensive equipment, such as wire bonders. Further, reliability is increased since the reliability of a thick film conductor is better than a wire bond. Also, it permits for a more uniform pressure to be placed on the screen 816. Moreover, resistivity is lowered and current load is increased.

Figure 8A:
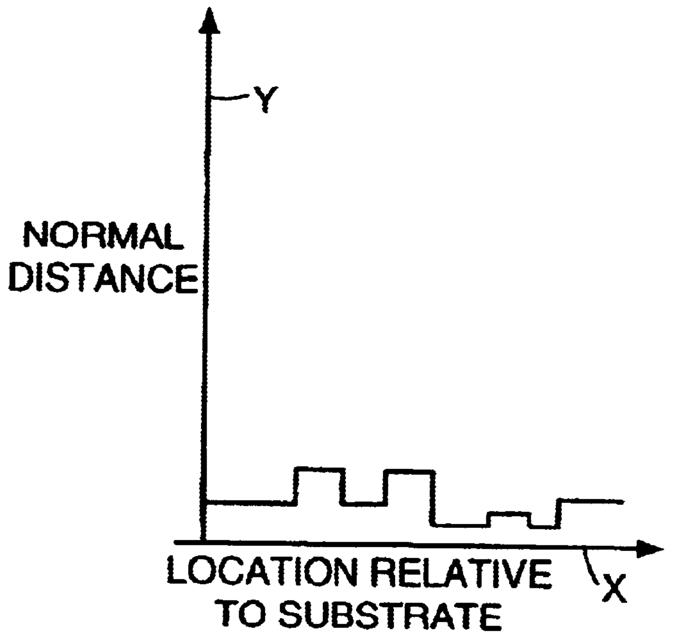
FIG. 8A is a graph of the distance between the distributing member and the substrate according as the distributing member moves along the substrate to an aspect of the invention.

According to still a further aspect of the invention, the snap off distance 808 between the screen 816 and the substrate 800 is varied responsive to predetermined parameters. For example, referring now to FIG. 8A, there is shown a graph in which the distance between the screen and the substrate is plotted along the Y axis relative to the location of the distributing member and the substrate on the X axis. As the distributing member is moved along the substrate in the X direction, its distance, or height, above the substrate is varied according to predetermined parameters. In one aspect, these parameters are stored in the memory of a computer which controls the movement of the distributing member in both the X and Y directions. These predetermined parameters are selected to maximize performance of different embodiments of the invention. Referring again to FIG. 8, another embodiment is provided in which moving the distributing member 810 comprises maintaining a substantially constant snap off distance 808 between the screen 816 and an upper surface of the substrate 814. As used herein, the upper surface of the substrate includes the upper surface of objects formed on the substrate, for example, the spacer 802. For example, in one version of the invention, when the distributing member 810 moves to the position shown by dotted line 810*a*, the distance 808 from the screen 816 to the substrate 800 is the same as the distance 804 from the screen 816*a* to spacer 802, even though the distance between the screen 816*a* and substrate 800 actually increases to distance 806. According to another embodiment of the invention, the constant snap off distance is maintained at about 0.01 to about 0.08 inches from the substrate 800. In another aspect, the snap off distance is maintained at about 0.025 to about 0.075 inches. According to other embodiments of the invention, the distance 804 may be different than the distance 808.

Figure 7:
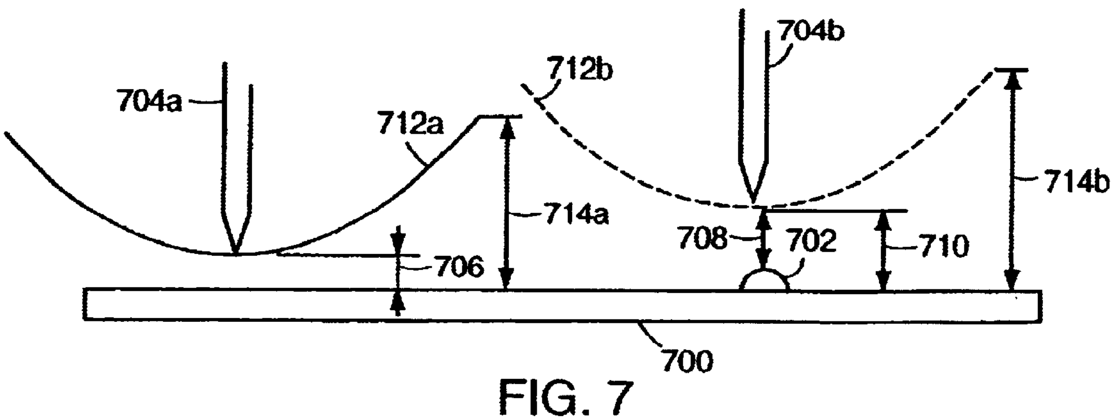
FIG. 7 is a plan view according to the present invention.

Referring now to FIG. 7, it will be noted that when pressure is applied to the screen 712*a* by distributing member 704*a*, the screen 712*a* deflects as shown. Therefore, the nearest distance between the screen 712*a* and the substrate surface 700 is 706 as shown, even though the snap off distance 714_a_ is somewhat greater. In order to maintain a constant distance between the screen 712_b_ and the substrate surface when the distributing member 704_a_ is at position 704_b_ it is necessary to increase the snap off distance 714_a_ to snap off distance 714_b_.

Therefore, in one embodiment, the invention allows for operation with two snap off distances in which the second snap off distance 714_b_ equals the first snap off distance 714_a_ plus the height of the spacer 702 above the substrate 700. In one aspect, the snap off distance is varied by moving the screen 712_a_ in relation to the substrate. Alternatively, the snap off distance is varied by moving the substrate away from the screen 712_a_. Those of skill in the art will recognize that more than two snap off distances are used according to other embodiments of the invention, and that the additional snap off distances are not necessarily selected solely to maintain a constant distance between the substrate surface and the screen.

For example, with reference to FIG. 8, in other embodiments of the invention, the snap off distance 808 is selected to achieve desired results. In one aspect of the invention, moving the distributing member 810 comprises varying the snap off distance 808 between the screen 816 and an upper surface 814 of the substrate 800 such that no damage occurs to the phosphor layer 812. In another example, moving the distributing member 810 comprises varying the snap off distance 808 between the screen 816 and an upper surface of the substrate 814 such that a substantially constant pressure is maintained on the upper surface 814 by the distributing member 810. In one aspect, the pressure is maintained at about 1 to about 60 psi. In another embodiment, the pressure is maintained between about 10 and about 30 psi. In another aspect, the pressure is maintained between about 15 and about 35 psi. In another aspect, moving the distributing member 810 comprises maintaining a substantially constant pressure on the screen 816 with the distributing member 810.

According to still a further embodiment, moving the distributing member 810 comprises moving the distributing member 810 along the substrate 800 at a velocity of about 1.0 to about 12.0 inches per second. In still a further embodiment, the velocity is between about 2.0 and about 8.0 inches per second.

Of course, it will be recognized that the screen must be held in place while the operation to form the conductive line is performed. In one example of an embodiment, placing a screen comprises bolting a screen frame to a machine with an X, Y and θ adjustment for aligning the conductor to the substrate.

Figure 9:
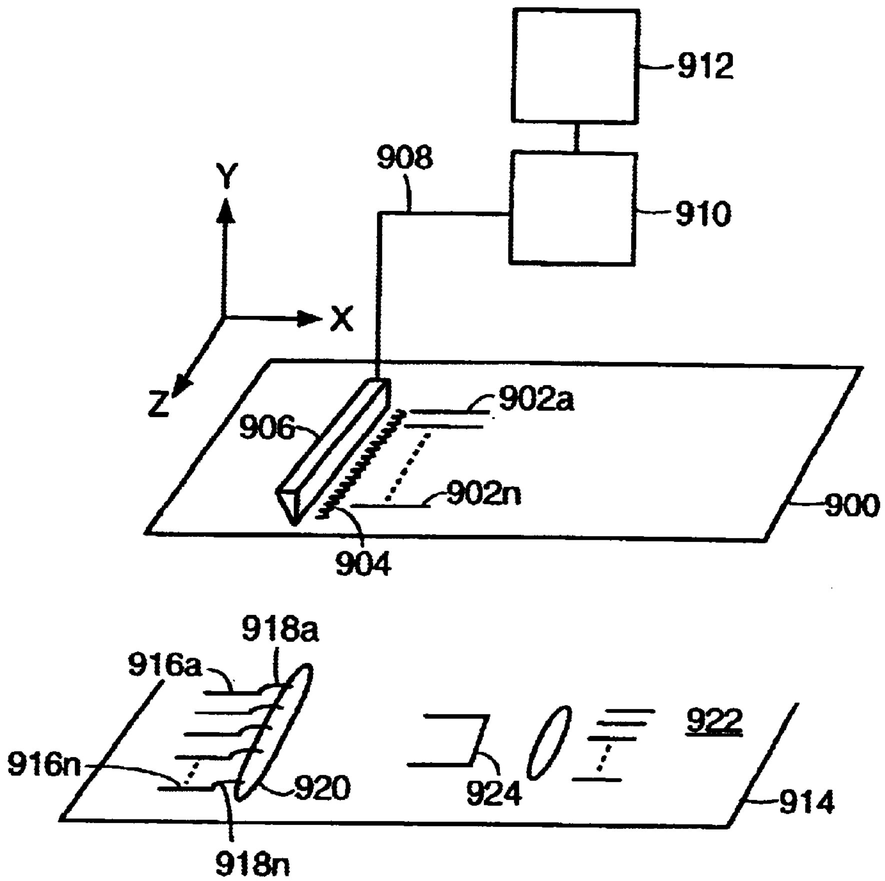
FIG. 9 is a block diagram of an apparatus according to the present invention.

Referring now to FIG. 9, in one aspect of the invention, there is provided an apparatus for forming conductive lines 918_a_–918_n_ between conductors 916_a_–916_n_ and a spacer 920 with the aid of a screen 900, the conductors 916_a_–916_n_ and the spacer 920 being formed on a substrate 914 of a field emission display, the screen 900 being disposed between the substrate 914 and a distributing member 906 and having openings 902_a_–902_n_ which permit the passage of a conductive material 904. According to one embodiment of the invention, the apparatus comprises a control circuit 912 which moves the distributing member 906 along screen 900 to pass the conductive material 904 through the openings 902_a_–902_n_ and form conductive lines 918_a_–918_n_ connecting the conductors 916_a_–916_n_ and the spacer 920. In one embodiment, control circuit 912 operates a servo system 910 which controls the movement of distributing member 906. An example of an acceptable control circuit 912 would be an MPC-29 manufactured by DeHaart Corp. of Mass. Other examples of control systems useful to control the distributing member will occur to those skilled in the art. In a further embodiment, the control circuit 912 varies the snap off distance between the screen 900 and the substrate 914 responsive to the spacer 920. In a still further aspect, the control circuit 912 varies the snap off distance between the screen 900 and the substrate 914 responsive to predetermined parameters stored in the control circuit memory. In an even further embodiment, the control circuit 912 moves the distributing member 906 such that a substantially constant distance between the screen 900 and an upper surface 922 of the substrate 914 is maintained. Alternatively, the control circuit 912 varies the distance between the screen 900 and an upper surface 922 of the substrate 914 such that no damage occurs to the phosphor layer 924. In yet a further embodiment, the control circuit 912 varies the distance between the screen 900 and an upper surface 922 of the substrate 914 such that a substantially constant pressure is maintained on the upper surface 922 by the distributing member 906.

Figure 10:
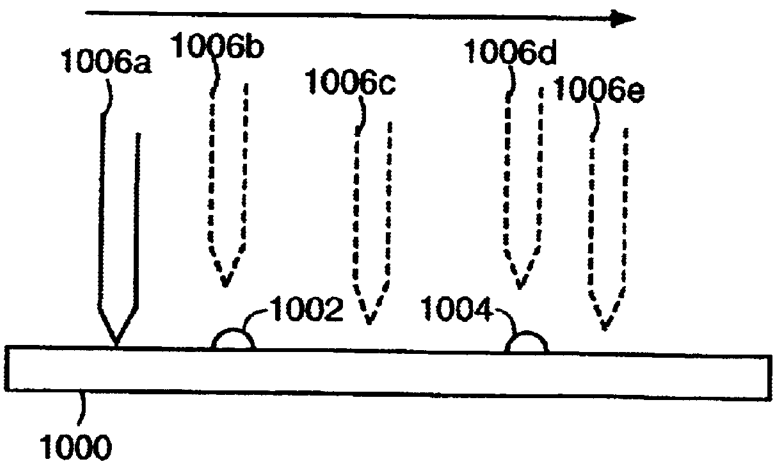
FIG. 10 is a plan view showing the vertical movement of the distributing member as it moves along the substrate.

FIG. 10 shows an embodiment of the invention in which a substrate 1000 is provided with spacers 1002 and 1004. A distributing members 1006 moves along the surface of a substrate 1000 from position 1006A to 1006B, 1006C, 1006D and 1006E. It is seen from the drawing that the vertical distance from the distributing member 1006 to the substrate 1000 changes as it passes over spacers 1002 and 1004.

What is claimed is:

1. A video display monitor, comprising:

a substantially transparent material, said material defining a surface;

a layer of phosphor disposed over a portion of said surface;

a spacer having a bottom portion to a top portion, said bottom portion being in contact with a portion of said surface, said top portion being spaced apart from said surface;

a first conductor disposed over a portion of said surface; and an extruded film conductor having a first end electrically connected to and extending from said first conductor and a second, end disposed substantially on said top portion of said spacer, said first end of said extruded film conductor being spaced from said top portion of said spacer.

2. A monitor according to claim 1, further comprising a baseplate disposed proximal to and spaced apart from said material, said baseplate including a second conductor disposed on a portion of said baseplate, said second conductor being electrically connected to said another end of said extruded film conductor.

3. A monitor according to claim 2, said baseplate further comprising at least one emitter.

4. A field emission display, comprising:

a baseplate structure; and a faceplate structure assembled with said baseplate structure, said faceplate structure comprising a substantially transparent substrate having phosphor material deposited on a first portion of a surface of the substrate, a spacer extending from a second portion of the surface, and a conductor disposed on a third portion of the surface, the faceplate structure also including an extruded conductive member having a first end electrically connected to and extending from the conductor and an opposite second end disposed on said spacer, said first end of said extruded film conductor being spaced from said spacer.

5. The field emission display of claim 4 wherein said extruded conductive member is formed from a conductive paste.

6. The field emission display of claim 5 wherein said conductive paste comprises a gold palladium paste.

7. The field emission display of claim 4 wherein said extruded conductive member comprises a thick film conductor.

8. The field emission display of claim 4 wherein said extruded conductive member is formed from a conductive paste forced through an opening in a screen.

9. The field emission display of claim 4 wherein said substrate comprises glass.

10. The field emission display of claim 4 wherein said baseplate structure includes a conductor in electrical contact with said opposite end of said extruded conductive member.

11. A face plate structure of a field emission display comprising a substantially transparent substrate having phosphor material deposited on a first portion of a surface of the substrate, a spacer extending from a second portion of the surface, and a conductor disposed on a third portion of the surface, the faceplate structure also including an extruded conductive line having a first end electrically connected to and extending from the conductor and an opposite second end disposed on said spacer, said first end of said extruded film conductor being spaced from said spacer.

12. The face plate structure of claim 11 wherein said extruded conductive line is formed from a conductive paste.

13. The face plate structure of claim 12 wherein said conductive paste comprises a gold palladium paste.

14. The face plate structure of claim 11 wherein said extruded conductive line comprises a film conductor.

15. The face plate structure of claim 11 wherein said substrate comprises glass.

16. The face plate structure of claim 11 wherein said extruded conductive line comprises conductive paste forced through an opening in a screen using a distributing member moved along the screen.

17. An electrical connection in a faceplate assembly of a field emission display, said field emission display comprising a baseplate assembly assembled with the faceplate assembly, said faceplate assembly comprising a substantially transparent substrate having phosphor material deposited on a first portion of a surface of the substrate, a spacer extending from a second portion of the surface, and a conductor disposed on a third portion of the surface, said electrical connection comprising an extruded conductive member having a first end electrically connected to and extending from the conductor and an opposite second end disposed on said spacer, said first end of said extruded film conductor being spaced from said spacer.

18. The electrical connection of claim 17 wherein said extruded conductive member is formed from a conductive paste.

19. The electrical connection of claim 18 wherein said conductive paste comprises a gold palladium paste.

20. The electrical connection of claim 17 wherein said extruded conductive member comprises a film conductor.

21. The electrical connection of claim 17 wherein said extruded conductive member is made from a conductive paste forced through an opening in a screen using a distributing member moved along the screen.

22. The electrical connection of claim 17 wherein said baseplate assembly includes a conductor in electrical contact with the end of said extruded conductive member on the spacer.

* * * * *